United States Patent [19]

Leder

[11] 4,163,471
[45] Aug. 7, 1979

[54] FORCED CONVECTION HEAT EXCHANGER FOR WARMING ARTICLES

[76] Inventor: Frederic Leder, 1635 Reef View Cir., Corona Del Mar, Calif. 92625

[21] Appl. No.: 901,505

[22] Filed: May 1, 1978

Related U.S. Application Data

[63] Continuation-in-part of Ser. No. 728,470, Sep. 30, 1976, abandoned.

[51] Int. Cl.$^2$ .............................. F28F 9/22; F28F 9/24
[52] U.S. Cl. .................................... 165/80 E; 126/261; 165/120; 165/147; 165/169; 220/DIG. 6
[58] Field of Search ................................ 126/261, 265; 220/DIG. 6, 411, 412; 165/71, 120, 169, 80 E, 80 R, 154, 147, 80 C; 215/12 R, 12 A, 13 R

[56] References Cited

U.S. PATENT DOCUMENTS

| | | | |
|---|---|---|---|
| 1,864,874 | 6/1932 | Voight | 220/DIG. 6 |
| 2,137,676 | 11/1938 | Martin | 165/80 E |
| 2,595,685 | 5/1952 | Mallory | 165/80 E |
| 3,255,813 | 6/1966 | Besson et al. | 165/80 C |
| 3,402,763 | 9/1968 | Peterson | 126/261 |

FOREIGN PATENT DOCUMENTS 1227847 4/1971 United Kingdom .............. 220/DIG. 6

Primary Examiner—Sheldon J. Richter
Attorney, Agent, or Firm—Arnold Grant

[57] ABSTRACT

A forced convection heat exchanger for warming articles such as baby bottles is provided comprising a container having walls extending upwardly from a bottom end to define an open top end. A platform to receive and support the article to be warmed is mounted within the container spaced apart from the container bottom end. A plurality of spacers extend inwardly from the walls and upwardly from the platform. First drain openings are provided extending through the platform and second drain openings are provided within the walls below the platform adjacent the bottom end. The area of the platform relative to the total cross-sectional area of the first drain openings is dimensioned so as to provide a standing head of water under turbulent flow conditions within the container substantially up to the container open top end when the container receives an average flow of water from a tap.

10 Claims, 3 Drawing Figures

FORCED CONVECTION HEAT EXCHANGER FOR WARMING ARTICLES

The application is a continuation-in-part of application Ser. No. 728,470, filed Sept. 30, 1976, now abandoned.

BACKGROUND OF THE INVENTION

The present invention relates to a heating device and in particular to a forced convection heat exchanger for use in warming baby bottles and the like.

Milk, infant formula, and similar foods for infants and young babies should preferably be furnished at body temperature (i.e., approximately 99° F.). Accordingly, when milk or infant formula is taken from a refrigerator, it must be heated prior to serving. Virtually every parent has gone through the procedure of sprinkling a few drops of milk from a heating bottle onto the back of his or her wrist to determine that the milk is at the proper temperature for baby. It is obviously desirable to bring the food from its refrigerator temperature to serving temperature as quickly as possible.

Heretofore, various devices have been available to facilitate warming such refrigerated foods. In the main, these devices rely on directly heating water to raise the temperature of the baby food to the desired temperature. The principal drawbacks of such devices have been:

1. They rely on an electric coil or other heating device which necessitates that the device can only be used where there is power available;
2. Unless carefully watched, the food container can overheat, boil and possibly spoil. This is particularly true in the case of milk, which, if boiled, will tend to "skim";
3. Plastic bottles can be melted;
4. Hot gases rising from the stove may make the top of the bottle and nipple very hot while the milk inside the bottle is still cold.
5. The devices have been relatively expensive.

It is because of the above that many parents have relied simply on placing a baby bottle in a pan of hot water taken directly from the tap and permitting the bottle to heat up in the water. The principal drawback of this method is that it takes a relatively long time for the bottle to heat up. Also, if the tap water is not sufficiently warm, the cold baby bottle can cool the water to below body temperature so that the bottle will never heat up to the desired temperature.

In view of the above, it is a principal object of the present invention to provide an improved heat exchanger particularly designed for warming a baby bottle or the like which overcomes each of the above noted objections of prior art devices.

A further object is to provide such a device which is relatively simple to manufacture, inexpensive to purchase, simple to operate, and completely passive in operation.

SUMMARY OF THE INVENTION

The above and other beneficial objects and advantages are attained in accordance with the present invention by providing an improved forced convection heat exchanger for warming articles such as baby bottles comprising a container having walls extending upwardly from a bottom end to define an open top end. A platform is mounted within the container spaced apart from the bottom end. A plurality of spacers extend inwardly from the walls and upwardly from the platform so that a bottle positioned within the container is held on the platform and away from the container walls. First drain openings are provided within the platform and second drain openings are provided within the walls below the platform adjacent the bottom end. The area of the platform relative to the total cross-sectional area of the first drain openings being dimensioned so as to provide a standing head of water under turbulent flow conditions substantially up to the container open top end when the container receives an average flow of water from a tap. The ratio of the area of the platform to the total cross-sectional area of the first drain openings is from about 130:1 to about 30:1, preferably from about 70:1 to about 35:1, and most preferably about 50:1.

DETAILED DESCRIPTION OF THE PREFERRED EMBODIMENT

Figure 1:
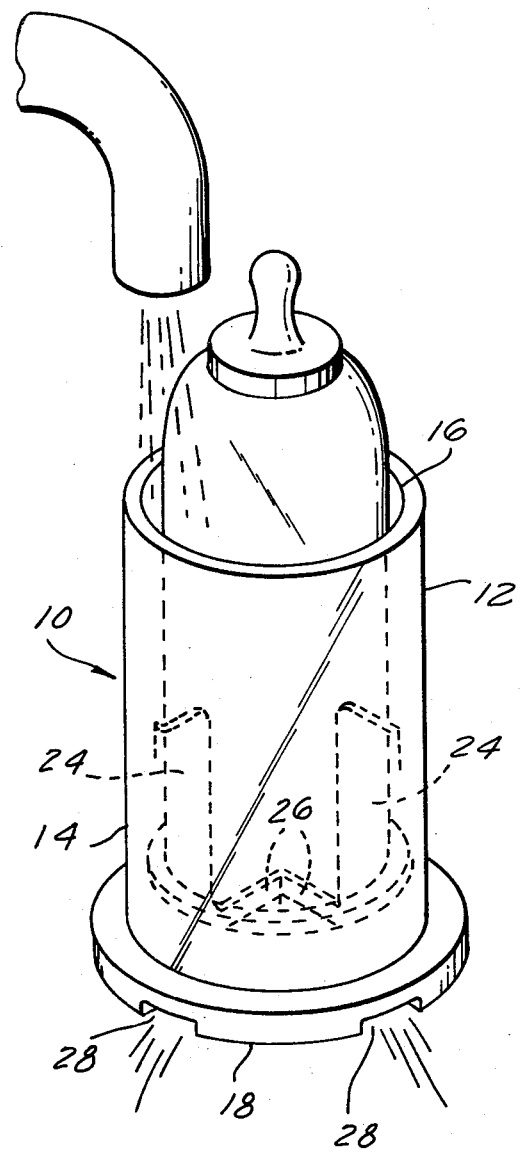
FIG. 1 is a perspective environmental view of a forced convection heat exchanger for warming articles in accordance with the present invention.

Reference is now made to the accompanying drawings wherein the forced convection heat exchanger for warming articles 10 in accordance with the present invention is depicted as consisting of a container 12 formed of upstanding walls 14 with an open top end 16. The bottom end 18 of the container is also open. The upstanding walls 14 may be cylindrical, frustro-conical, with the diameter of the bottom end 18 greater than the diameter of the top end 16 or inverted frustro-conical with the diameter of the top end 16 greater than the diameter of the bottom end 18; in the latter case of inverted frustro-conical, support legs (not shown) extending outwardly from the bottom end may be provided. Cylindrical walls are preferred.

A platform 20 is positioned within the container spaced slightly above the bottom end 18. The platform conforms to the dimensions of the upstanding walls and in the embodiment shown comprises a circular disk secured about its entire periphery to the interior surfaces of walls 14. A series of first drain openings 22 extend completely through the platform providing access between the portion of the container above and below the platform.

The ratio of the area of the platform to the total cross-sectional area of the first drain openings 22 plays an important part in the performance of the present invention. More particularly, a ratio of from about 130:1 to about 30:1, preferably about 70:1 to about 35:1 and most preferably about 50:1 provides a standing head of turbulent flowing water surrounding the bottle which, in turn, results in a rapid transfer of heat to the baby bottle.

Figure 2:
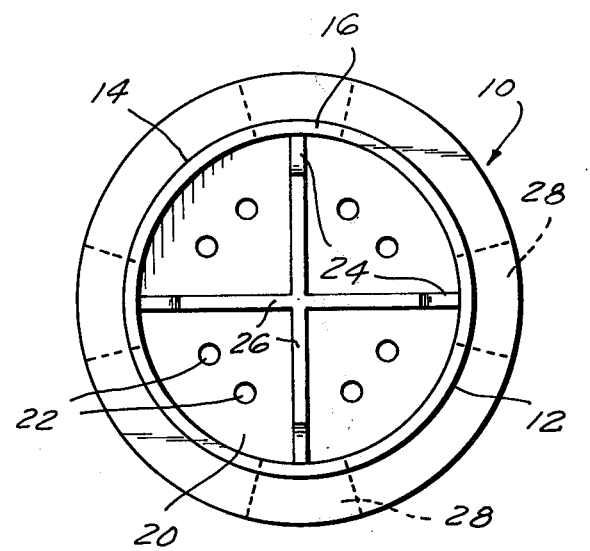
FIG. 2 is a top plan view of the forced convection heat exchanger for warming articles; and, FIG. 3 is a side elevational sectional view of the forced convection heat exchanger for warming articles in accordance with the present invention.
Figure 3:
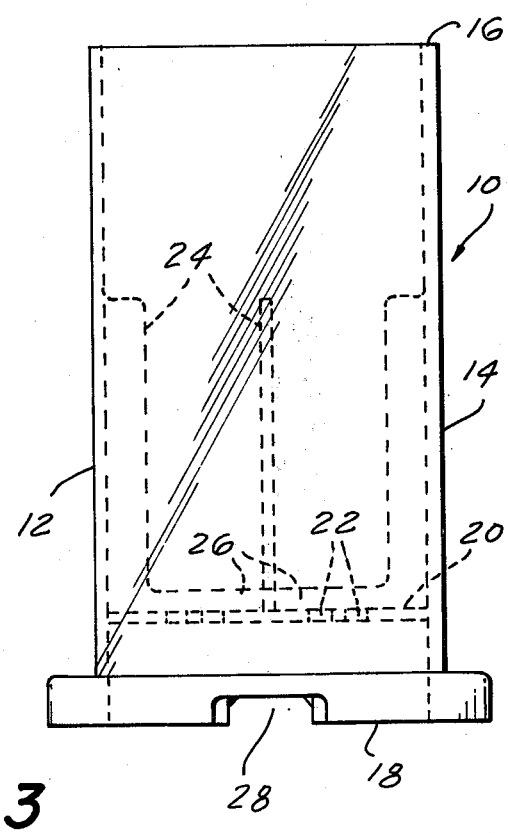

A plurality of wall spacer elements 24 extend inwardly from the internal surfaces of the wall 14 and a plurality of platform spacer elements 26 extend upwardly from the platform 20. As shown in FIG. 1, the spacers are designed to serve two functions; first they engage the surfaces of the bottle and thereby center the bottle within the container. Secondly, they act as baffles to further enhance the turbulent flow of the standing head of water and the rapid transfer of heat from the water to the baby bottle. Four wall spacers 24 are provided angularly spaced apart from each other by 90° although any number greater than one will suffice. The spacers may extend either part way up the walls of the container, as shown, or all the way up the walls of the container from substantially adjacent the platform to substantially adjacent the open top end. The flatform spacers 26 are, in the embodiment shown, aligned with the wall spacers 24 and are formed of two members intersecting each other at 90° extending diametrically across the top of the platform. As can be seen in FIG. 2, the platform spacers divide the platform into four equal portions and two first drain openings 22 are provided in each of the portions. Other arrangements for the platform spacers such as parallel or "T" shaped are also within the scope of the invention.

A second drain opening 28 is provided in the sidewalls below the platform 20. The cross-sectional area of the second drain opening 28 is considerably larger than the total cross-sectional area of all the first drain openings 22.

The forced convection heat exchanger for warming articles may be formed of any suitable material such as acrylic plastic or polypropylene.

Since most baby bottles have an outside diameter of about 2.25 inches, the preferred internal dimensions of the forced convection heat exchanger for warming articles is a diameter of from about 3 to about 6 inches, most preferably about 3.25 to about 4.50 inches. Thus the baby bottle will occupy from about 15 to about 50 percent, preferably 25 to 40 percent, of the cross-sectional area of the container of the forced convection heat exchanger for warming articles of the present invention.

The preferred height is about 6.62 inches which also conforms with the standard baby bottle.

In a successful practice of the invention, the forced convection heat exchanger for warming articles 10 was formed of acrylic plastic. The inner diameter of the cylinder was approximately 3.85 inches and the wall spacers 24 extended inwardly approximately 0.75 inches each thereby providing a space between opposed spacers of 2.37 inches. This was found sufficient to hold a conventional baby bottle as required apart from the cylinder wall. Platform spacers 26 extended upwardly 0.25 inches from the platform. The cylinder walls as well as the spacers were each 0.075 inches thick. The platform was 0.10 inches thick.

The overall height of the device was 6.62 inches with the platform positioned 1 inch above the bottom end of the cylinder so that the neck of a baby bottle would extend over the top end of the cylinder. Openings 22 in the platform were each approximately 0.20 inches in diameter and the drain openings comprised generally rectangular slots 1"×0.25".

In operation, a baby bottle is placed within the unit resting on the platform spacers and held apart from the cylinder wall by the wall spacers. Hot water from a tap is allowed to run down the bottle, out through the openings 22 and the drain opening 28. The openings 22 are such that when a tap flows with an average flow of two gallons per minute, the height of water within the unit may be maintained substantially to the top of the unit thus providing a standing head while simultaneously providing turbulence along the length of the bottle within the unit to effect efficient heat transfer. With the bottle at a temperature of approximately 40° F. and water at approximately 175° F., the bottle will warm to body temperature within about 80 to about 100 seconds.

As can be seen from the above, the forced convection heat exchanger for warming articles of the present invention is efficient, effective and meets each of the aforementioned objectives. While only a single embodiment of my invention has been described, it should be understood that modifications to the described embodiment may be made without the departing from the scope of my invention which is set forth in the following claims.

I claim:

1. A forced convection heat exchanger for warming articles comprising a container having walls extending upwardly from a bottom end to define an open top end; a platform to receive and support a baby bottle mounted within the container spaced apart from the bottom end thereof; plurality of spacers extending inwardly from the walls to position the baby bottle within the container; a set of first drain openings extending through the platform, the area of the platform relative to the total cross-sectional area of the first drain openings providing a standing head of water under turbulent flow conditions within the container substantially up to the container open top end when the container receives an average flow of water from a tap; and, a second set of drain openings within the walls below the platform.

2. A forced convection heat exchanger as defined in claim 1 further comprising at least one spacer extending upwardly from the platform to raise the baby bottle off of the platform when it is positioned in the container.

3. A forced convection heat exchanger as defined in claim 1 wherein the ratio of the area of the platform to the total cross-sectional area of the first drain openings is from about 130:1 to about 30:1.

4. A forced convection heat exchanger as defined in claim 1 wherein the ratio of the area of the platform to the total cross-sectional area of the first drain openings is from about 70:1 to about 35:1.

5. A forced convection heat exchanger as defined in claim 1 wherein the baby bottle will occupy from about 15 to about 50 percent of the cross-sectional area of the container.

6. A forced convection heat exchanger as defined in claim 1 wherein the baby bottle will occupy from about 25 to about 40 percent of the cross-sectional area of the container.

7. A forced convection heat exchanger as defined in claim 1 wherein the ratio of the area of the platform to the total cross-sectional area of the first drain openings is from about 130:1 to about 30:1 and the baby bottle will occupy from about 15 to about 50 percent of the cross-sectional area of the container.

8. A forced convection heat exchanger as defined in claim 1 wherein the spacers extending inwardly from the walls extend longitudinally from substantially adjacent to the platform to substantially adjacent the top end of the container.

9. A forced convection heat exchanger according to claim 1 wherein the upwardly extending walls are frustro-conical in shape.

10. A forced convection heat exchanger according to claim 1 wherein the diameter of the top end is greater than the diameter of the bottom end.

* * * * *